United States Patent [19]
Tyson

[11] Patent Number: 5,738,403
[45] Date of Patent: Apr. 14, 1998

[54] VEHICLE PROTECTIVE COVER

[76] Inventor: Carolyn L. Tyson, 6649 Columbine Way, Plano, Tex. 75093

[21] Appl. No.: 638,433

[22] Filed: Apr. 26, 1996

[51] Int. Cl.⁶ .................................................. B60J 11/00
[52] U.S. Cl. ........................................................ 296/136
[58] Field of Search ........................... 296/136; 150/166

[56] References Cited

U.S. PATENT DOCUMENTS

| | | | |
|---|---|---|---|
| 4,598,883 | 7/1986 | Suter | 244/1 R |
| 4,799,728 | 1/1989 | Akers et al. | 296/136 |
| 4,807,922 | 2/1989 | Glover | 296/136 |
| 4,825,889 | 5/1989 | Monteith | 296/136 X |
| 4,929,016 | 5/1990 | Kastanis | 296/136 |
| 4,951,993 | 8/1990 | Taboada | 296/136 |
| 5,024,479 | 6/1991 | Bryngelson | 296/97.7 |
| 5,209,545 | 5/1993 | Slaugh | 296/136 |
| 5,242,206 | 9/1993 | Heck | 296/136 |
| 5,273,316 | 12/1993 | Infante | 296/136 X |
| 5,287,904 | 2/1994 | Smith et al. | 150/166 |
| 5,324,090 | 6/1994 | Lehnhoff | 296/136 X |
| 5,343,915 | 9/1994 | Newsome | 150/166 |
| 5,350,000 | 9/1994 | Wang | 150/166 |
| 5,413,396 | 5/1995 | Poznansky et al. | 296/136 |

*Primary Examiner*—Andrew C. Pike
*Attorney, Agent, or Firm*—Joseph F. DePumpo

[57] ABSTRACT

A vehicle protective cover includes a plurality of lightweight separable panels, each having an inner layer, a thicker shock absorbing center layer, and a substantially thinner outer layer that defines a skirt having plural spaced-apart tie-down lines for securing the cover on the vehicle with the skirt disposed extending from the vehicle in a tensioned, stand-off position.

20 Claims, 6 Drawing Sheets

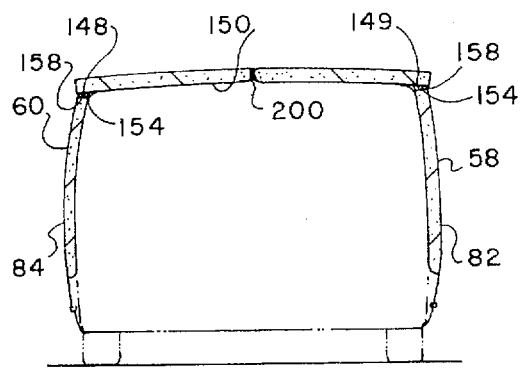
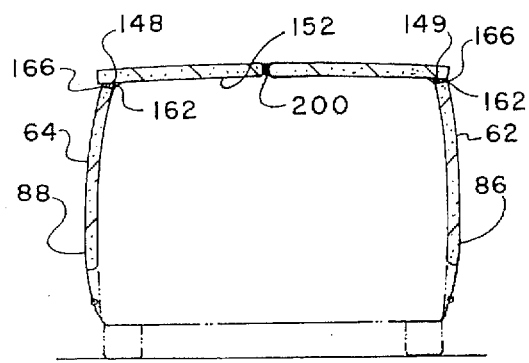
FIG. 8  FIG. 9
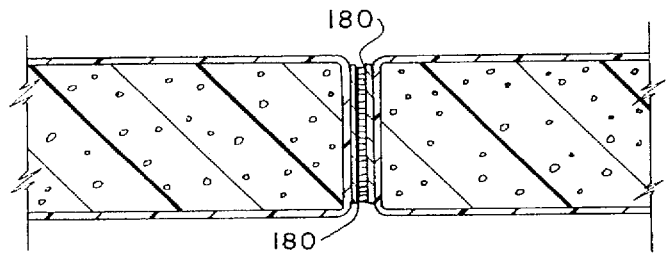
FIG. 10
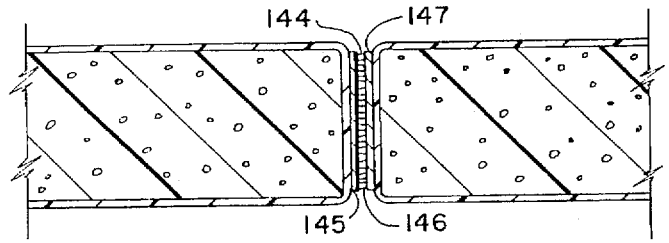
FIG. 13
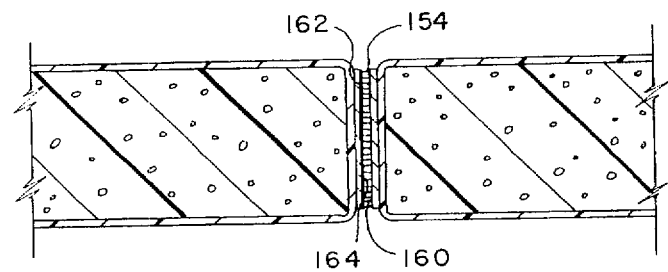
FIG. 15

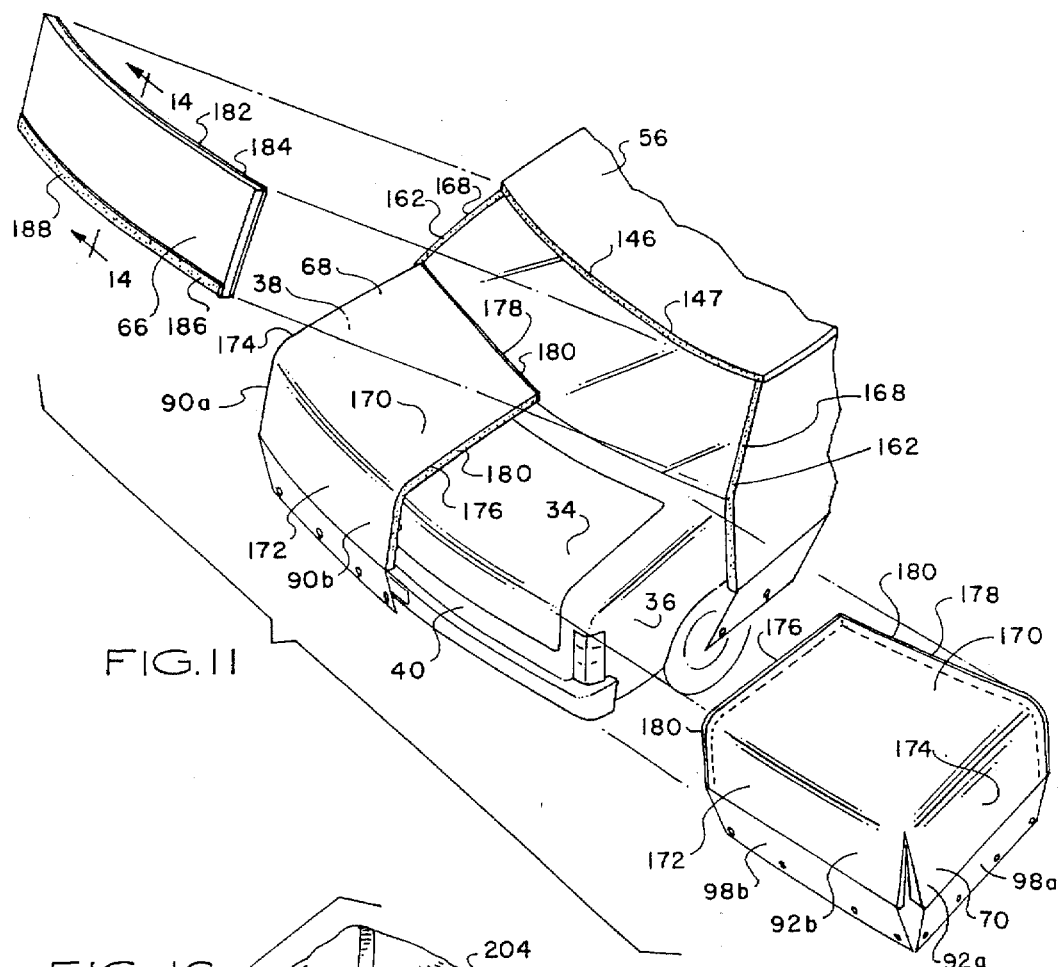
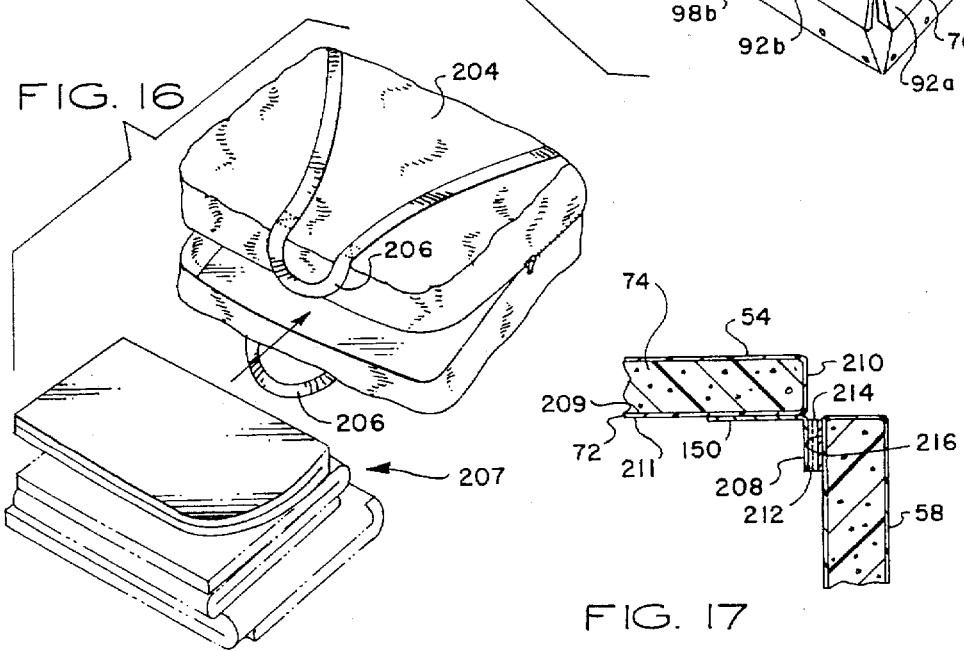

VEHICLE PROTECTIVE COVER

FIELD OF THE INVENTION

This invention relates generally to covers for motor vehicles and in particular to a motor vehicle cover comprising a plurality of panels which can be detachably connected together by quick release fastener means.

BACKGROUND OF THE INVENTION

Vehicle covers have been used to protect parked or stored vehicles from damage caused by environmental and weather conditions such as solar radiation, heat, pollution, dust, acid rain, sleet, hail, and flying objects which may be encountered during violent or severe weather. Although existing vehicle covers adequately protect against some of those conditions, most are not very effective at preventing damage to the exterior of the vehicle from hailstones and other hard objects.

Those covers which are designed to protect against such hard objects are bulky and cumbersome, making installation and removal an arduous and time consuming process. Moreover, such covers are typically difficult to store due to their bulk.

DESCRIPTION OF THE PRIOR ART

Various types of vehicle covers have been proposed. Prior art approaches include a cover constructed of canvas or nylon and having a means for securing the cover to the vehicle such as an elastic band extending about its periphery. Those designs suffer in that they will not protect the vehicle from hard objects such as hail stones.

Another prior art vehicle cover provides for the use of an inflatable air chamber or a plurality of such chambers which envelop the vehicle when the cover is installed on the vehicle. That approach requires a source of compressed air to inflate the chamber(s), and the inflated chambers are cumbersome and bulky. Moreover, inflating and deflating such covers tends to be a labor intensive and time consuming process.

Accordingly, there is a need for a new and improved vehicle protective cover which can be hastily assembled and placed on the vehicle upon notification of imminent adverse weather conditions.

SUMMARY OF THE INVENTION

The present invention provides an improved cover for motor vehicles that is easy to install on and remove from a vehicle and store when not in use, and which provides improved protection. In accordance with one important aspect of the invention, a vehicle cover is provided comprising a plurality of panels which can be detachably connected together by quick release fastener means.

In accordance with another important aspect of the invention, the panels include a shock absorbing center layer to protect the vehicle from hail stones and other hard objects.

In accordance with still another important aspect of the invention, the cover includes a depending panel portion which extends along a side of the vehicle and defines a skirt which extends from the vehicle in a tensioned, stand-off position.

In accordance with yet another aspect of the invention, the depending panel portion may include L-shaped or U-shaped portion to increase the distance that the skirt stands off from the surfaces of the vehicle.

In accordance with still another aspect of the invention, the panels can be quickly disassembled so that the cover can be placed in a compact storage configuration.

One advantage of the vehicle cover of the present invention is that it is comprised of a plurality of panels which can be quickly connected together to form the assembled cover in the event of impending adverse weather conditions.

In accordance with another advantage of the present invention, some of the panels include a tensioned fabric portion which stands off from the vehicle surface to protect that surface.

Another advantage of the present invention is that the assembled cover has large relatively flat surfaces which are ideal for advertizing and/or decorative designs.

Still another advantage of the present invention is that the cover is durable, pliable and easily kept clean. Moreover, the cover can be quickly and conveniently disassembled and placed in a compact storage configuration.

As will become more apparent hereinafter, the present invention provides a new and improved vehicle cover that can be effectively utilized on all types of vehicles, and it achieves the foregoing advantages in a novel and unobvious manner.

BRIEF DESCRIPTION OF THE DRAWINGS

Referring now to the drawings in which like reference numerals and letters indicate corresponding elements throughout several views:

FIG. 8 is a section view taken generally along line 8—8 of FIG. 1;

FIG. 9 is a section view taken generally along line 9—8 of FIG. 1;

FIG. 10 is a section view taken generally along line 10—10 of FIG. 1;

FIG. 11 is a partial perspective view of the cover shown in FIG. 1 with the passenger's side rear panel and the rear window panel removed;

FIG. 13 is a section view taken generally along line 13—13 of FIG. 1;

FIG. 15 is a section view taken generally along line 15—15 of FIG. 1;

FIG. 16 is a perspective view showing the vehicle cover folded for placement in a storage bag in accordance with the invention;

FIG. 17 is a partial section view taken generally in the same plane as FIG. 8; and showing an alternate panel attachment means;

DETAIL DESCRIPTION OF THE PREFERRED EMBODIMENTS

Figure 1:
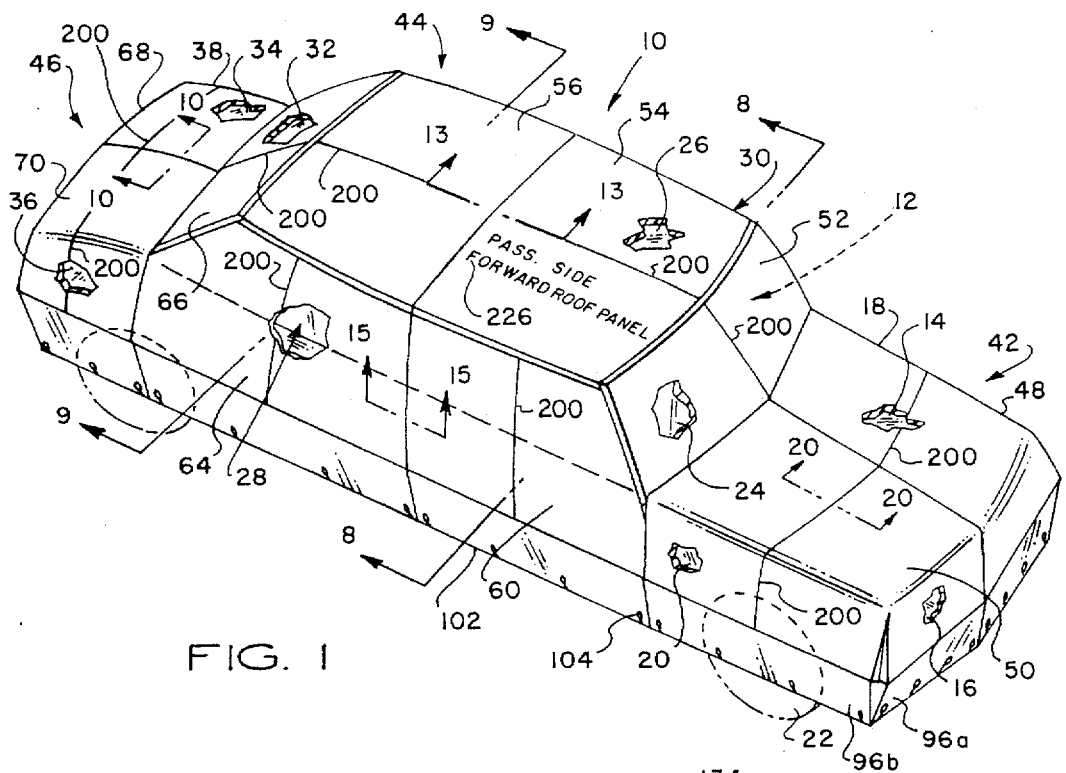
FIG. 1 is a perspective view of a vehicle protective cover constructed according to the teachings of the present invention shown installed on a motor vehicle.

In the description which follows, like parts are marked throughout the specification and drawings with the same reference numerals, respectively. The drawing figures are not necessarily drawn to scale and the proportions of certain parts may be exaggerated for purposes of clarity.

As shown in the exemplary drawings, the present invention is embodied in a novel and unique cover 10 which, in an assembled condition can be installed on a conventional motor vehicle as shown in FIG. 1. The vehicle 12 may be a conventional automobile (a four door sedan is shown), van, light or heavy duty truck, for example. In the assembled condition, as shown, the cover 10 covers the vehicle hood 14, the front face 16, the driver's side front fender 18, a portion of the driver's side front wheel and tire (not shown), the passenger's side front fender 20, a portion of the passenger's side front wheel and tire 22, the cabin (including the windshield 24, roof 26, the passenger's side door(s) and side windows 28, the driver's side door(s) and side windows 30, and the rear window 32), the trunk lid 34, the passenger's side rear fender 36, the driver's side rear fender 38, and the rear face 40 (see FIG. 11).

In a preferred embodiment, the cover 10 is comprised of a plurality of panels which can be detachably connected together to form the assembled cover as shown in FIG. 1. In the assembled condition, the cover 10 defines a front portion 42, an intermediate portion 44, and a rear portion 46.

The front portion 42 includes a driver's side front panel 48 and a passenger's side front panel 50. As best shown in FIGS. 1,8,9 and 11, the intermediate portion 44 includes a windshield panel 52, a forward top panel 54, a rearward top panel 56, a driver's side forward side panel 58, a passenger's side forward side panel 60, a driver's side rearward side panel 62, a passenger's side rearward side panel 64, and a rear window panel 66. The rear portion 46 includes a driver's side rear panel 68, and a passenger's side rear panel 70.

Figure 5:
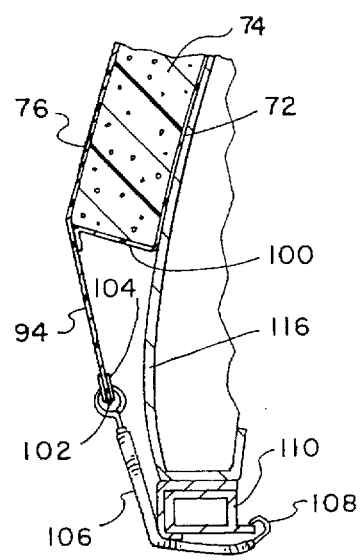
FIG. 5 is a section view taken generally along line 5—5 of FIG. 2.

Referring now to FIG. 5, each panel (panel 60 is shown by way of example) includes an inner layer 72, a center layer 74, and an outer layer 76. In a preferred embodiment, the inner layer 72 is constructed of a water resistant woven, knit or cast nylon material such as 400-denier nylon pack cloth which will not damage the paint finish of the vehicle. Alternatively, the inner layer may be constructed of cotton, polyester, or canvas cloth which will not harm the paint finish. The center layer 74 may be constructed of a shock and impact absorbing material such as closed-cell polyurethane foam having a nominal thickness of about ¾ in. The outer layer may be constructed of water resistant nylon material such as 400-denier nylon pack cloth, or polyester or canvas cloth.

The driver's side front panel 48, passenger's side front panel 50, driver's side forward side panel 58, passenger's side forward side panel 60, driver's side rearward side panel 62, passenger's side rearward side panel 64, driver's side rear panel 68, and passenger's side rear panel 70 respectively include depending panel portions 78a, 78b, 80a, 80b, 82, 84, 86, 88, 90a, 90b, 92a, and 92b (see FIGS. 3, 8, 9 and 11) which extend in a generally vertical orientation along the sides of the vehicle and include a skirt 94 (see FIG. 5). Referring to FIGS. 1 and 11, the driver's side front and rear panels 48 and 68 are mirror images of the passenger's side front and rear panels 50 and 70, and include respective skirt portions like skirt portions 96a, 96b, 98a, and 98b. Referring back to FIG. 5, the lower edge 100 of the center layer 74 of each depending panel portion is located at the approximate midline of the doors (not including the window portion of the doors), and each skirt 94 may be formed as shown by extending the outer layer 76 of each depending panel portion beyond the lower edge 100 of the center layer 74 of the depending panel portion. The layers may be connected to each other and to the skirt 94 by alternate means, not shown.

Figure 18:
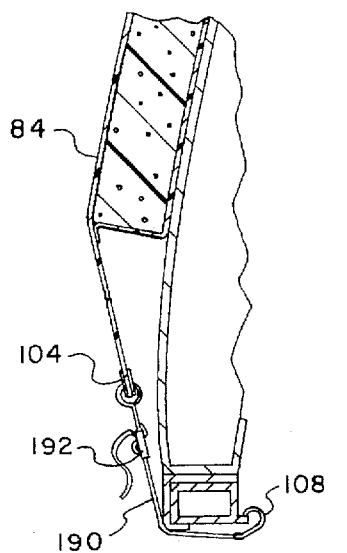
FIG. 18 is a section view taken generally in the same plane as FIG. 5 and showing an alternate panel attachment strap assembly.
Figure 19:
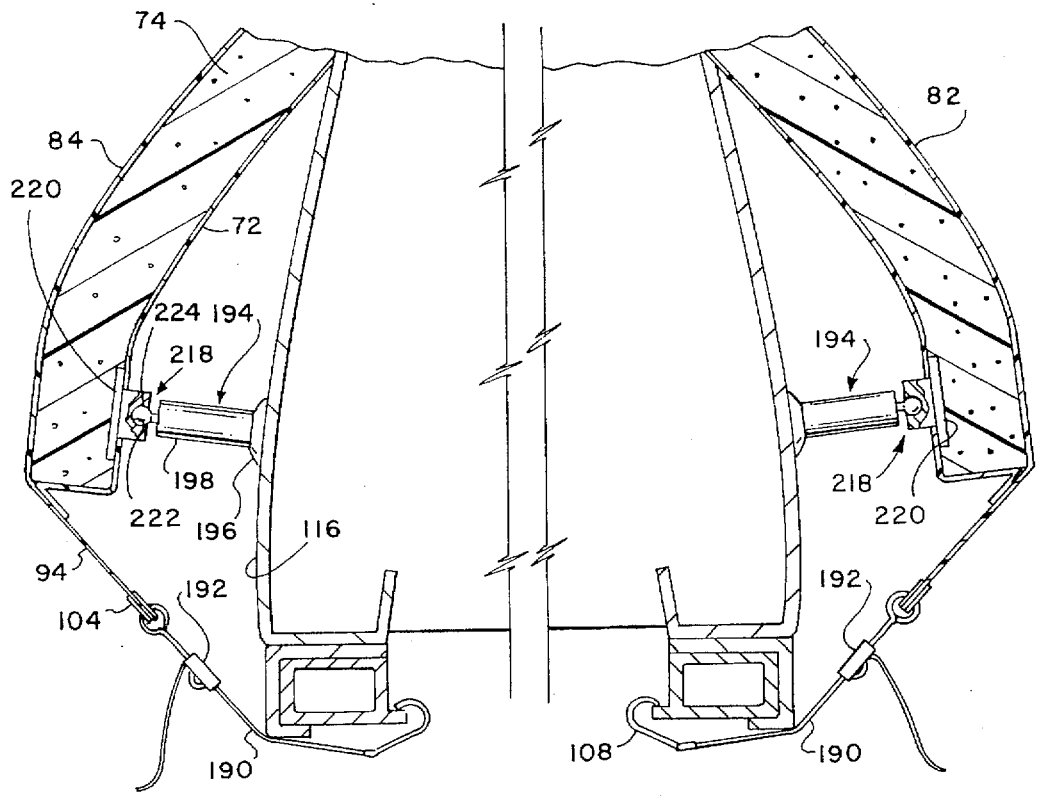
FIG. 19 is a section view taken generally in the same plane as FIG. 5 and showing a standoff device for the cover on both sides of the vehicle.

Referring now to FIGS. 1 and 5, the horizontal bottom edge 102 of each skirt 94 includes a plurality of spaced eyelets 104, and a resilient stretchable cord member 106 having a rubberized hook member 108 attached to its distal end extends from each eyelet 104. Alternatively, as shown in FIGS. 18 and 19, a nylon strap 190 with a conventional strap adjustment mechanism 192 and having a rubberized hook member 108 attached thereto may extend from each eyelet 104. The assembled cover 10 is secured snugly on the vehicle 12 by stretching each resilient cord member 106 and securing the hook member 108 to the lower edges of the vehicle body portions, the front and rear bumpers or to the undercarriage 110 of the vehicle 12 (see FIG. 5). If the nylon straps 190 are utilized, the hook members 108 are attached to the vehicle at appropriate locations on the vehicle, and the strap adjustment mechanisms 192 permit the user to secure the cover 10 snugly on the vehicle 12. When the cover 10 is installed in such a manner, the skirt 94 is pulled tight and in a stand-off position from the vehicle by the elasticity of the resilient cord members 106 or the tautness of the nylon straps 190, so that hail or flying debris striking the skirt 94 will be deflected therefrom, and the surface of the vehicle 12 will not be damaged.

Figure 6:
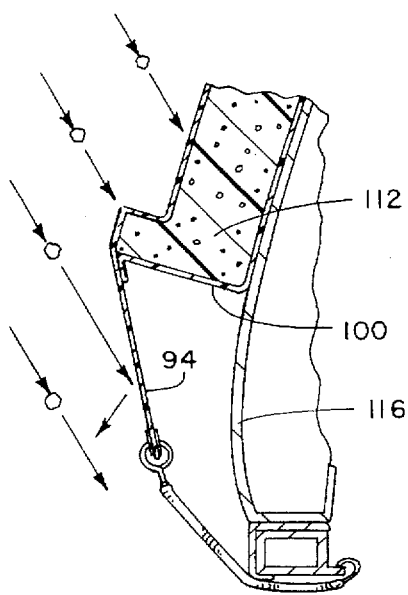
FIG. 6 is a section view similar to FIG. 5 of a first alternate embodiment of the present invention.
Figure 7:
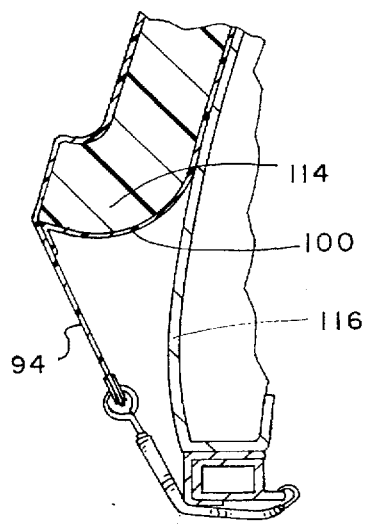
FIG. 7 is a section view similar to FIG. 5 of a second alternate embodiment of the present invention.

As illustrated in the alternate embodiments of FIGS. 6 and 7, the lower edge 100 of the center layer 74 may include an L-shaped portion 112, or a curved, partial U-shaped portion 114 which will increase the distance that the skirt 94 stands off from the surface 116 of the vehicle 12 to insure that hail or flying debris will be deflected by the skirt 94.

Alternatively, as shown in FIG. 19, a plurality of spacers 194 may be provided to increase and maintain the distance that the skirt 94 stands off from the surfaces of the vehicle 12 including surface 116. Each spacer 194 may comprise a rubber or plastic suction cup 196, and a shank 198 having one end secured to the suction cup 196 and the other end secured to the depending panel portion. The shank 198 may be rotatably secured to the depending panel portion through provision of a ball and socket assembly 218, for example. The ball and socket assembly 218 includes a base member 220 which may be adhesively secured to the inner layer 72 and/or the center layer 74, and which includes a socket 222. The shank 198 includes a ball 224 which seats in and is retained by the socket 222. Other means of connecting the cup 196 to the cover 10 may be provided.

Figure 3:
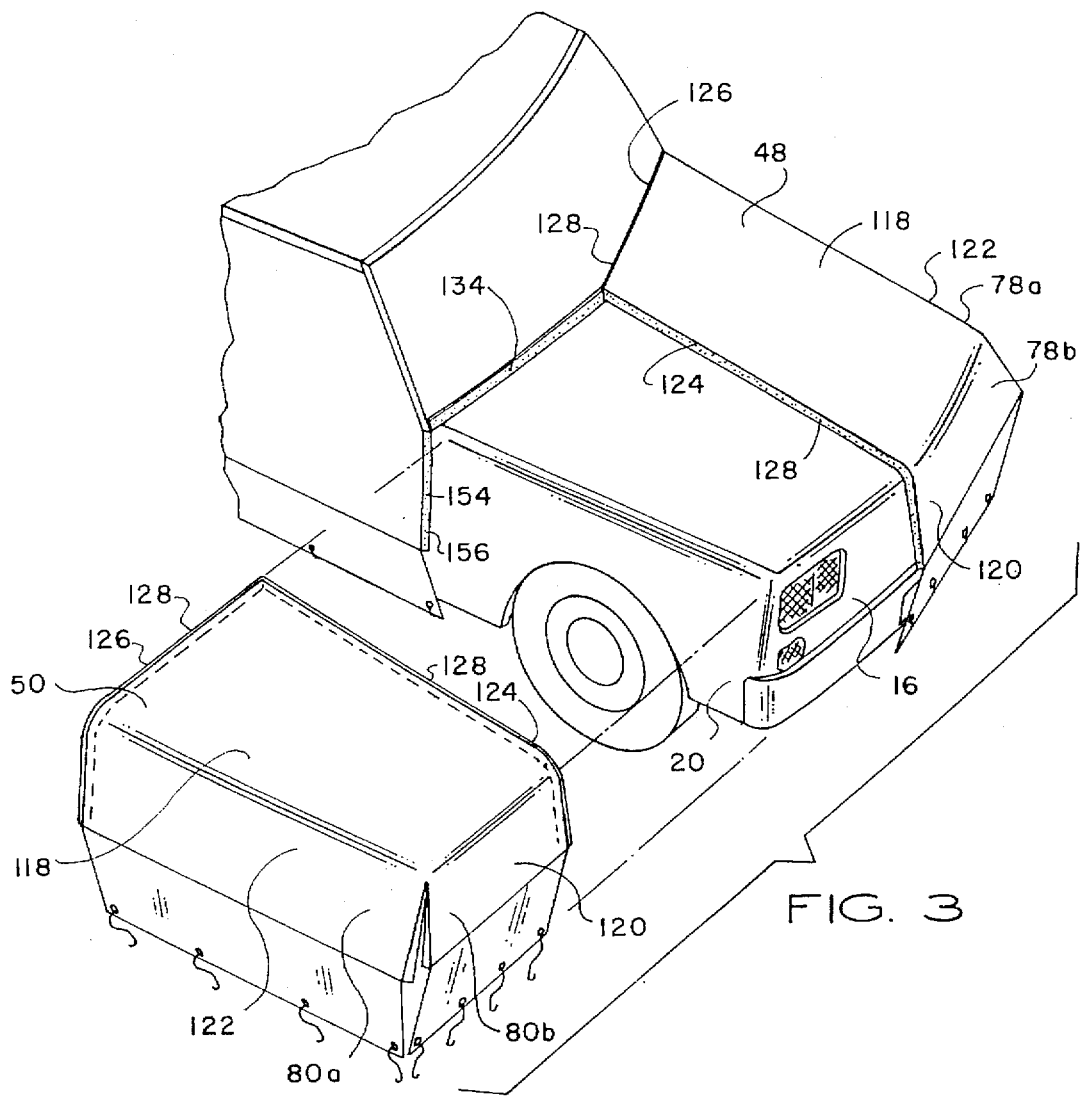
FIG. 3 is a partial perspective view of the cover shown in FIG. 1 with the passenger's side front panel removed.

As shown in FIG. 3, the passenger's side front panel 50 and the driver's side front panel 48 each include a top section 118, a front section 120, and a side section 122. The top sections 118, front sections 120, and side sections 122 may be individual pieces connected together to form panels 48 and 50, or alternatively, panels 48 and 50 may be folded or bent at the junctions of the vehicle sections to form sections 118, 120, and 122. Each top section 118 extends across approximately one half of the surface area of the hood 14, and each front section 120 depends from the top section 118 and extends across a portion of the front face 16. Each side section 122 depends from the top section 118 and covers the respective fender 18, 20 and a portion of the respective front wheel and tire. The inner face 124 and the rear face 126 of the driver's side front panel 48 and the passenger's side front panel 50 have a fastener strip 128 attached thereto.

Figure 2:
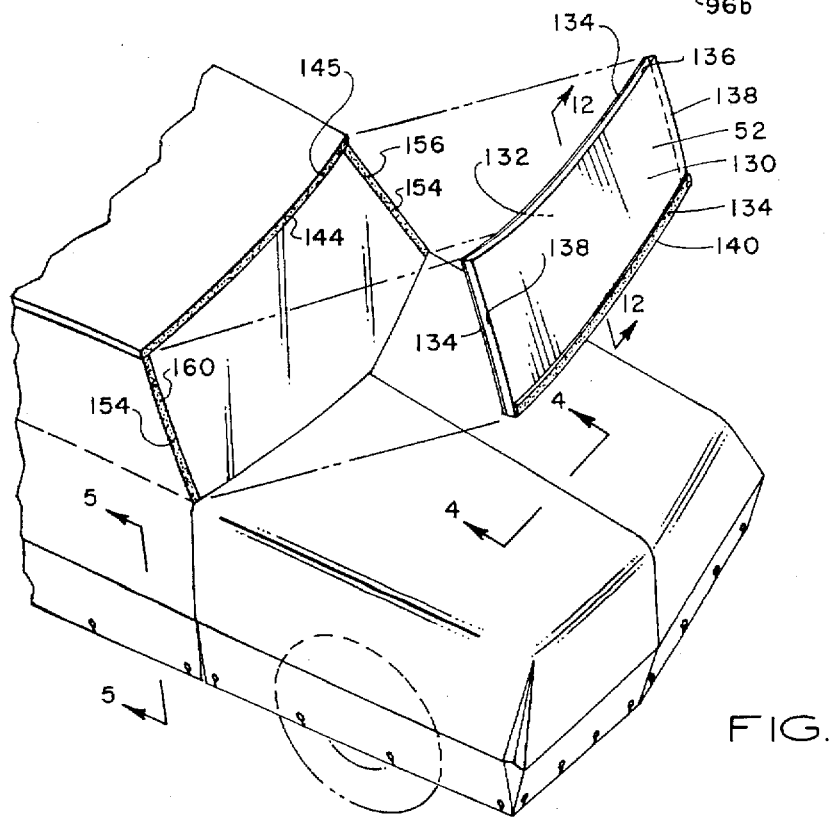
FIG. 2 is a partial perspective view of the cover shown in FIG. 1 with the windshield panel removed.
Figure 12:
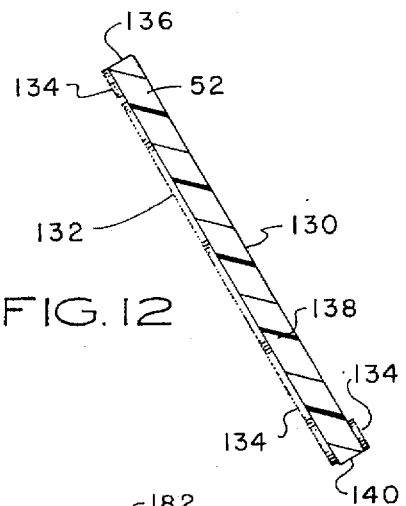
FIG. 12 is a section view taken generally along line 12—12 of FIG. 2.
Figure 14:
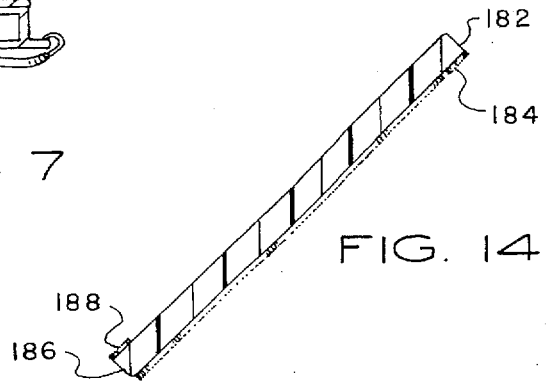
FIG. 14 is a section view taken generally along line 14—14 of FIG. 11.

As can be seen in FIGS. 2 and 12, the windshield panel 52 includes a front face 130 and a rear face 132. A fastener strip 134 extends along the upper edge 136 and sides 138 of the rear face 132, and across the lower edge 140 of the front face 130. As shown in FIG. 3, the fastener strip 134 across the lower edge 140 of the front face 130 engages the fastener strip 128 on the rear face 126 of the top section 118 of each front panel 48, 50 when the cover is in the assembled condition.

Referring now to FIGS. 1, 2, 8, 9, 11, and 13 the forward top panel 54 and the rearward top panel 56 each include a fastener strip 144 along the front face 145, a fastener strip 146 along the rear face 147, and a pair of fastener strips 148, 149 along the side edges of the respective bottom faces 150, 152.

The driver's side forward and rearward side panels 58, 62 are mirror images of the respective passenger's side forward and rearward side panels 60, 64. As illustrated in FIGS. 1, 2, 3, 8, and 15, the driver's side forward side panel 58 and the passenger's side forward side panel 60 each include a fastener strip 154 along their front face 156, top face 158 and rear face 160. Similarly, as shown in FIGS. 9, 11 and 15, the driver's side rearward side panel 62, and the passenger's side rearward side panel 64 each include a fastener strip 162 along their front face 164, top face 166, and rear face 168. The driver's side forward side panel 58 and the passenger's side forward side panel 60 may each be formed with pockets or may have a cut-away portion to accommodate driver's and passenger's side rear view mirrors.

Referring now to FIG. 11, the passenger's side rear panel 70 and the driver's side rear panel 68 each include a top section 170, a rear section 172, and a side section 174. The top sections 170, rear sections 172, and side sections 174 may be individual pieces connected together to form panels 68 and 70, or alternatively, panels 68 and 70 may be folded or bent at the junctions of the vehicle sections to form sections 118, 120, and 122. Each top section 170 extends across approximately one half of the surface area of the trunk lid 34, and each rear section 172 depends from the top section 170 and extends across a portion of the rear face 40 of the vehicle 12. Each side section 174 depends from the top section 170 and covers the respective rear fender 36, 38 and a portion of the respective rear wheel and tire. The inner face 176 and the front face 178 of the driver's side rear panel 68 and the passenger's side rear panel 70 have a fastener strip 180 attached thereto. Moreover, the rear panels 68, 70 and/or the front panels 48, 50 may include an aperture for the vehicle antenna to extend through.

In a preferred embodiment, the fastener strips comprise mating hook and loop type fasteners; however, other fastening means such as strips of snaps, or zippers can also be used.

Although the embodiments described and shown are desirable in that they minimize the number of panels, those skilled in the art will appreciate that each panel may be comprised of multiple panel pieces detachably connected by fastener strips. For example, the windshield panel 52 and the rear window panel 66 may be comprised of two pieces which are detachably connected at the center line of the windshield or rear window. Moreover, the forward top panel 54 and the rearward top panel 56 may each comprise two pieces detachably connected along the center line of the roof 26.

Figure 20:
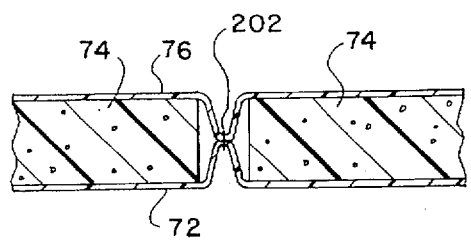
FIG. 20 is a section view taken along line 20—20 of FIG. 1.

In addition, some or all of the panels of cover 10 may include a fold line 200, as illustrated in FIG. 1. Referring to FIG. 20, by way of example, the fold line 200 of panel 50 may be formed by bifurcating the center layer 74 of the panel, and stitching the inner layer 72 and the outer layer 76 together along the juncture 202 between the separated center layer pieces, as shown. The fold lines 200 enable the panels to be folded into a compact configuration. As shown in FIG. 16, the folded panels can be stacked flat on one another to form a stack 207, and placed in a closeable nylon bag 204 with carrying handles 206 when the cover is not needed.

Figure 4:
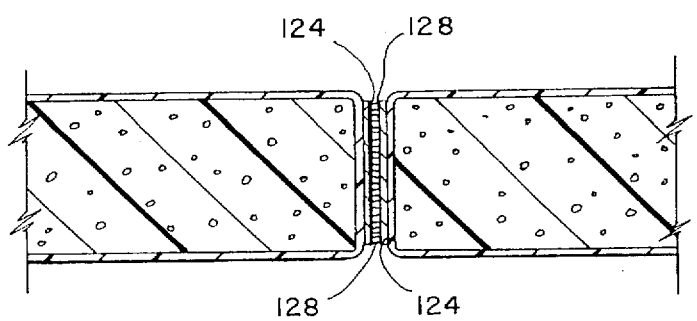
FIG. 4 is a section view taken generally along line 4—4 of FIG. 2.

A method of assembling the cover 10 will now be described. The front portion 42 of the cover 10 is assembled by placing the passenger's side front panel 50 and the driver's side front panel 48 on the respective front corners of the vehicle 12 and securing the fastener strips 128 together as illustrated in FIGS. 3 and 4. The lower edge 140 of the windshield panel 52 may then be secured to the rear face 126 of the passenger's side and driver's side front panels by connecting fastener strips 128 and 134.

The forward top panel 54 and the rearward top panel 56 may then be placed on the roof 26 of the vehicle 12 and connected together as shown in FIGS. 1 and 13. The front face 145 of the forward top panel 54 can be connected to the upper edge 136 of the rear face 132 of the windshield panel 52 by securing fastener strips 134 and 144 together as illustrated in FIG. 2. The upper edge 182 of the rear window panel 66 is then connected to the rearward top panel 56 by way of mating fastener strips 184 and 146 as shown in FIG. 11.

The rear portion 46 of the cover 10 can be assembled next by placing the passenger's side rear panel 70 and the driver's side rear panel 68 on the respective rear corners of the vehicle 12 and securing the fastener strips 180 together as illustrated in FIGS. 10 and 11. The lower edge 186 of the rear window panel can then be secured to the front face 178 of the passenger's side and driver's side rear panels by connecting fastener strips 180 and 188 as shown in FIG. 11.

The passenger's side forward side panel 60 may then be connected to the passenger's side rearward side panel 64 through mating fastener strips 154, 162 in the same manner shown in FIGS. 1 and 15, and then attached to the forward top panel 54 and rearward top panel 56 as shown in FIGS. 8 and 9. Similarly, the driver's side forward side panel 58 may then be connected to the driver's side rearward side panel 62 through mating fastener strips 154, 162 as shown in FIG. 15, and then attached to the forward top panel 54 and rearward top panel 56 as shown in FIGS. 8 and 9.

Referring now to FIG. 17, an alternate means for connecting the panels is disclosed. By way of example, the joint between the forward top panel 54 and the driver's side forward side panel 58 is shown. However, this means of interconnecting the panels can be implemented at all panel connection locations. As shown in FIG. 17, the forward top panel 54 may include an elongated flap portion 208 extending along and beyond the edge 210 of the panel 54 and having a hook and loop fastener strip 212 secured thereto.

The elongated flap portion 208 may be secured to the inner wall 209 or the outer wall 211 of the inner layer 72, or to the center layer 74. The forward side panel 58 may include a mating fastener strip 214 extending along its upper edge 216 which allows the forward top panel 54 to be detachably connected to the forward side panel 58.

When no longer needed, the cover 10 may be disassembled by disconnecting the panels and removing them from the vehicle. Each panel can then be folded or rolled into a compact configuration, and the resilient cord members 106 can be wrapped around the folded or rolled panels. The hook member 108 at the end of each resilient member 106 can then be attached to the wrapped resilient member 106 to secure the panel in the folded or rolled condition. Each panel can then be placed in the storage bag 204 which can be kept in the trunk of the vehicle when the cover is not needed.

The construction of the cover 10 makes it durable, pliable, and easy to wash. Moreover, advertising or a decorative design may adorn the panels to further enhance its aesthetic appeal and/or commercial value. In addition, as shown by way of example in FIG. 1, instructions in the form of indicia 226 may be printed on the panels for assisting a user in installing and removing the cover 10. Those components of the cover 10 not specifically mentioned may be made of conventional materials normally used for similar applications.

The foregoing description of the invention has been presented for purposes of illustration and description. It is not intended to be exhaustive or to limit the invention to the precise form disclosed. Many modifications and variations are possible in light of the above teaching. It is intended that the invention can be limited not by this detailed description, but rather by the scope and spirit of the claims appended hereto.

What is claimed is:

1. A protective vehicle cover for protecting a motor vehicle from hard objects comprising:

a depending panel portion extending along a side of said vehicle, said depending panel portion including a layer having a lower edge and being constructed of a shock absorbing material having a predetermined thickness, said depending panel portion further including a flexible skirt having a thickness substantially less than the thickness of the layer, said skirt extending beyond the lower edge in a tensioned, stand-off position from said side of said vehicle.

2. The vehicle cover of claim 1 wherein said depending panel portion is in a generally vertical orientation.

3. The vehicle cover of claim 1 wherein the skirt is removably connected to the vehicle by a hook member.

4. The vehicle cover of claim 3 wherein a resilient member is interposed between the skirt and the hook member.

5. The vehicle cover of claim 3 wherein an adjustable strap is interposed between the skirt and the hook member.

6. The vehicle cover of claim 1 wherein the lower edge is defined by an L-shaped portion.

7. The vehicle cover of claim 1 wherein the lower edge is defined by a partial U-shaped portion.

8. The vehicle cover of claim 1 further including at least one spacer interposed between the depending panel portion and the vehicle for holding at least part of said panel portion away from a surface of said vehicle.

9. The vehicle cover of claim 8 wherein the spacer includes a shank having a suction cup at one end.

10. The vehicle cover of claim 9 wherein another end of the shank is rotatably secured to the depending panel portion through a ball and socket assembly.

11. A protective vehicle cover for protecting a motor vehicle from hard objects comprising:

a plurality of panels detachably connected together by releaseable fastener means, at least one of said panels including a depending panel portion extending along a side of said vehicle, said depending panel portion including a layer having a lower edge and being constructed of a shock absorbing material having a predetermined thickness, said depending panel portion further including a flexible skirt having a thickness substantially less than the thickness of the layer, said skirt extending beyond the lower edge in a tensioned, stand-off position from the side of said vehicle.

12. The vehicle cover of claim 11 wherein at least one of said panels includes a fold line which provides for forming a folded said panel.

13. The vehicle cover of claim 12 further including a storage bag for storing plural ones of said folded panels.

14. A cover for protecting a motor vehicle from hard objects comprising:

a plurality of panels, each of said panels being adjacent to another of said panels and including releasable fastener means thereon cooperable with said releasable fastener means on the adjacent said panel whereby said panels can be detachably connected together, said panels each including an inner layer, a shock absorbing center layer having a predetermined thickness and a lower edge, and an outer layer; and a plurality of flexible skirts, each of said skirts having a thickness substantially less than the thickness of the center layer and extending beyond the lower edge of a predetermined said panel, and operable to be connected to said vehicle in a tensioned, stand-off position from outer surfaces of said vehicle to protect said surfaces.

15. A protective cover for protecting a motor vehicle from hard objects comprising:

a plurality of panels detachably connected together by releasable fastener means, at least one of said panels having a fold line which enables the one panel to be folded into a compact configuration for placement in a storage bag, and the one panel including a depending panel portion extending along a side of said vehicle, the depending panel portion including a layer having a predetermined thickness and a lower edge, the depending panel portion further including a flexible skirt having a thickness substantially less than the thickness of the layer extending beyond the lower edge in a tensioned, stand-off position from the side of said vehicle.

16. The protective cover of claim 15 wherein each panel that includes a fold line further comprises an inner layer, a center layer, and an outer layer, and said fold line is formed at a juncture of at least two adjacent parts of the center layer by stitching the inner layer and the outer layer together along said juncture.

17. A protective cover for a motor vehicle comprising:

a pair of opposed front panels, each of said opposed front panels including releaseable fastener means cooperable with releaseable fastener means on the other of said opposed front panels when said front panels are disposed on said vehicle;

a windshield panel including releaseable fastener means, the releaseable fastener means on said windshield panel cooperable with the releaseable fastener means on said pair of opposed front panels when said windshield panel and said opposed front panels are disposed on said vehicle;

a forward top panel including releaseable fastener means, the releaseable fastener means on said forward top panel cooperable with the releaseable fastener means on said windshield panel when said forward top panel and said windshield panel are disposed on said vehicle;

a rearward top panel including releaseable fastener means, the releaseable fastener means on said rearward top panel cooperable with the releaseable fastener means on said forward top panel when said rearward top panel and said forward top panel are disposed on said vehicle;

a pair of forward side panels, each of said pair of forward side panels including releaseable fastener means, the releaseable fastener means on each of said pair of forward side panels cooperable with the releaseable fastener means on said forward top panel and the releaseable fastener means on said windshield panel, when said pair of forward side panels, said forward top panel, and said windshield panel are disposed on said vehicle;

a pair of rearward side panels, each of said pair of rearward side panels including releaseable fastener means, the releaseable fastener means on each of said pair of rearward side panels cooperable with the releaseable fastener means on said rearward top panel and the releaseable fastener means on one of said pair of forward side panels when said pair of rearward side panels, said rearward top panel, and said pair of forward side panels are disposed on said vehicle;

a rear window panel including releaseable fastener means, the releaseable fastener means on said rear window panel cooperable with the releaseable fastener means on said rearward top panel when said rear window panel and said rearward top panel are disposed on said vehicle; and a pair of opposed rear panels, each of said opposed rear panels including releaseable fastener means cooperable with releaseable fastener means on the other of said opposed rear panels and the releaseable fastener means on said rear window panel when said pair of opposed rear panels and said rear window panel are disposed on said vehicle.

18. The protective cover of claim 17 wherein each of said opposed from panels and said opposed rear panels includes a depending portion which extends in a generally vertical orientation along sides of said vehicle.

19. The protective cover of claim 17 wherein each of said pair of opposed front panels, said windshield panel, said forward top panel, said rearward top panel, each of said pair of forward side panels, each of said pair of rearward side panels, said rear window panel, and each of said pair of opposed rear panels includes an inner layer, a shock absorbent center layer and an outer layer.

20. The protective cover of claim 17 further including a storage bag for storing said pair of opposed front panels, said windshield panel, said forward top panel, said rearward top panel, said pair of forward side panels, said pair of rearward side panels, said rear window panel, and said pair of opposed rear panels.

* * * * *